United States Patent
Kaku

(10) Patent No.: US 9,156,382 B2
(45) Date of Patent: Oct. 13, 2015

(54) VEHICLE SEAT

(75) Inventor: Hiroyuki Kaku, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 164 days.

(21) Appl. No.: 13/811,009

(22) PCT Filed: Jul. 21, 2011

(86) PCT No.: PCT/JP2011/066619
§ 371 (c)(1),
(2), (4) Date: Jan. 18, 2013

(87) PCT Pub. No.: WO2012/011544
PCT Pub. Date: Feb. 26, 2012

(65) Prior Publication Data
US 2013/0113246 A1    May 9, 2013

(30) Foreign Application Priority Data

Jul. 21, 2010 (JP) ................................. 2010-164337
Jul. 21, 2010 (JP) ................................. 2010-164338

(51) Int. Cl.
  *B60N 2/42* (2006.01)
  *B60N 2/427* (2006.01)
  *B60N 2/68* (2006.01)
(52) U.S. Cl.
  CPC ............ *B60N 2/4228* (2013.01); *B60N 2/4235* (2013.01); *B60N 2/42709* (2013.01); *B60N 2/42745* (2013.01); *B60N 2/68* (2013.01)
(58) Field of Classification Search
  USPC ............................. 297/216.13, 216.14, 216.1
  See application file for complete search history.

(56) References Cited

U.S. PATENT DOCUMENTS

| | | | | |
|---|---|---|---|---|
| 5,716,094 A * | 2/1998 | Bhalsod et al. | .......... | 296/187.12 |
| 5,979,979 A * | 11/1999 | Guerinot et al. | .......... | 297/216.13 |
| 6,854,698 B2 * | 2/2005 | Oddsen, Jr. | ................ | 248/274.1 |
| 7,232,150 B2 * | 6/2007 | Nagayama | ................. | 280/730.2 |
| 7,404,606 B2 * | 7/2008 | Kim | ............................ | 297/408 |
| 7,731,292 B2 * | 6/2010 | Ishijima et al. | .......... | 297/452.18 |
| 7,963,599 B2 * | 6/2011 | Omori et al. | ............. | 297/216.12 |
| 7,967,380 B2 * | 6/2011 | Omori et al. | ............... | 297/284.4 |

(Continued)

FOREIGN PATENT DOCUMENTS

| | | |
|---|---|---|
| CN | 101624027 A | 1/2010 |
| JP | 2000-103275 A | 4/2000 |

(Continued)

OTHER PUBLICATIONS

Office Action issued for CN 201180035504.1 (Oct. 10, 2014).

*Primary Examiner* — Sarah B McPartlin
(74) *Attorney, Agent, or Firm* — Drinker Biddle & Reath LLP

(57) ABSTRACT

Provided is a vehicle seat having a sufficient strength against an impact load due to collision in a peripheral structure of a side frame and having a reduced size of the peripheral structure of the side frame. The vehicle seat includes a seat back frame having a side portion located on a lateral side, a load input member arranged on the lateral side of the seat back frame so that a load from another member is input thereto, a pressure receiving member coupled to the seat back frame via a joint member and supporting an occupant, and an impact reduction member arranged on at least one side of the side portion, engaging with the joint member, and moving the pressure receiving member rearward by an impact load applied to the pressure receiving member.

14 Claims, 13 Drawing Sheets

(56) References Cited

U.S. PATENT DOCUMENTS

2002/0043832 A1* 4/2002 Watanabe ................ 297/216.13
2009/0021061 A1* 1/2009 Yamaki et al. ........... 297/216.13
2010/0007174 A1 1/2010 Yamaki et al.

FOREIGN PATENT DOCUMENTS

| JP | 2009-023517 A | 2/2009 |
| JP | 2009-046112 A | 3/2009 |
| JP | 2010-018190 A | 1/2010 |

* cited by examiner

VEHICLE SEAT

CROSS REFERENCE TO RELATED APPLICATIONS

This application is the U.S. national phase of the International Patent Application No. PCT/JP2011/066619, filed Jul. 21, 2011, which claims the benefit of Japanese Patent Application No. 2010-164337, filed Jul. 21, 2010, and Japanese Patent Application No. 2010-164338, filed Jul. 21, 2010, the entire content of all being incorporated herein by reference.

BACKGROUND

Disclosed herein is a vehicle seat, and specifically a vehicle seat with an improved attachment workability of peripheral members to a side frame by reducing the size of a peripheral structure of the side frame.

In the case of a so-called rear end collision in which an end portion of a vehicle such as an automobile is impacted from behind or has a severe collision during backward driving, generally a head of an occupant may be suddenly inclined backward due to the inertia force and his/her neck may be damaged.

Therefore, a seat for a vehicle such as an automobile has a headrest above a seat back to receive the head of the occupant from behind in order to protect the head and the neck of the occupant from an impact load due to rear end collision to reduce the damage on the neck.

However, providing the head rest alone cannot reduce the impact load on the body, and it may also be difficult to sufficiently reduce the impact on the neck unless a gap between the head of the occupant and the headrest is immediately reduced at the time of read-end collision.

To solve this problem, a technique is known in which an impact is effectively reduced by providing a seat back frame equipped with a pressure receiving member for receiving a load of an occupant with a link member movable with respect to the side frame and attaching the link member to the pressure receiving member via a joint member, and thereby sufficiently causing the occupant to sink into the seat back at the time of the collision (see Japanese Patent Document No. 2009-023517 A ("the '517 Document")).

It is required for the vehicle seat to retain a seating space of the occupant without deformation of the vehicle seat by impact energy upon rear end collision as well as side collision, thereby ensuring safety of the occupant.

As a technique of keeping the safety of the occupant against such a side collision, a technique of arranging a side bracket on a lateral side of the vehicle and also on a door side is disclosed (see Japanese Patent Document 2000-103275 A ("the '275 Document")). According to this technique, when an impact load is applied from the lateral side, the impact load is transferred to the vehicle seat via a receiving member (side bracket) and tilts the vehicle seat toward the center of the vehicle body without deformation of the vehicle seat, thereby preventing the occupant from contacting a structure of the vehicle body.

The seat back frame disclosed in the '517 Document can sufficiently cause an occupant to sink toward the seat back frame at the time of rear end collision by receiving a rearward movement of the occupant by the pressure receiving member and thus pivoting the link member. Furthermore, because the link member is disposed with a biasing element and the biasing element typically inhibits pivoting of the pressure receiving member, a seating comfort will not be impaired. Moreover, a plurality of stoppers for regulating an allowable moving range of the link member is disposed near the link member, which can regulate the range of sinking the occupant.

According to the technique disclosed in the '275 Document, at the time of a side collision, the load is transferred from a pushing member provided on the vehicle body side to the receiving member (side bracket) arranged to protrude on the lateral side of the vehicle seat (more specifically, the lateral side of the seat back frame), resulting in the vehicle seat tilting toward the center of the vehicle body. Thus, by transferring the impact of a side collision to the vehicle body side, the seating space of the occupant can be ensured in the vehicle seat, thereby ensuring safety of the occupant.

However, when the pressure receiving member having the link member disclosed in the '517 Document and the receiving member disclosed in the '275 Document are provided to the vehicle seat in order to improve the safety against both rear end collision and side collision, a plurality of members are densely arranged on the lateral side of the seat back frame, i.e., in the periphery of the side frame. When many members are arranged in the periphery of the side frame in this manner, due to a large number of the components, it is required to spare a relatively large space on the lateral side of the seat back frame, which disadvantageously reduces the design freedom and reduces the seating space of the occupant, thereby reducing the occupant's comfort.

To counter the disadvantage, if a space reduction is intended by reducing the size of each member, there would be a risk of reducing durability against an impact at the time of rear end collision and side collision because each member is not strong enough. Especially the receiving member (side bracket) laterally protruding from the side frame requires a sufficient strength because it directly receives the impact of a side collision, and it also requires a certain size to effectively transfer the load of a side collision to the vehicle body side.

In other words, it has been difficult to both obtain the strength (rigidity) against rear end collision and side collision as well as reducing the size of the peripheral structure of the side frame. Therefore, a technique for both reducing the size of the peripheral structure of the side frame and providing the peripheral structure of the side frame having a sufficient strength against collision has been desired.

Furthermore, when many members are arranged in the periphery of the side frame, there is a disadvantage that the workability of attachments is impaired because an attachment structure of each member becomes complex due to a large number of the components. Therefore, a technique for improving the attachment workability of the members in the periphery of the side frame in the vehicle seat has been desired.

SUMMARY

It is an object of various embodiments of the present invention to provide a vehicle seat having enough strength against the impact load due to collision and having a reduced size of peripheral structure of the side frame. It is another object to provide a vehicle seat with an improved attachment workability of the members in the periphery of the side frame.

The above problems can be solved by providing a seat back frame having a side portion located on a lateral side, a load input member arranged on the lateral side of the seat back frame so that a load from another member is input thereto, a pressure receiving member coupled to the seat back frame via a joint member and supporting an occupant, and an impact reduction member arranged on at least one side of the side portion, engaging with the joint member, and moving the pressure receiving member rearward by an impact load applied to the pressure receiving member.

In this manner, by providing the load input member to the side portion of the seat back frame and providing the pressure receiving member coupled to the impact reduction member, the vehicle seat disclosed herein can effectively reduce the load applied to an occupant by receiving the load of the collision, transferring the load to a member configuring the seat frame, and also causing a body of the occupant to sink rearward at the time of rear end collision.

Furthermore, because the impact reduction member is also provided to the side portion configuring the seat back frame, when the impact load of rear end collision is applied thereto, the impact reduction member moves the pressure receiving member rearward. Thus, by causing the body of the occupant to sink rearward at the time of rear end collision, the load applied to the occupant can be effectively reduced.

In this manner, by providing the load input member and the impact reduction member to the side portion, a sufficient strength against the impact load of a side collision and rear end collision can be achieved, and the impact load applied to the occupant can be efficiently absorbed.

In this case, it is preferable for the load input member to be arranged on a laterally outer surface of the side portion and for the impact reduction member to be arranged on a laterally inner surface of the side portion.

Thus, by providing the load input member on the lateral (in a seat-width direction) outside of the side portion (side frame) and the impact reduction member on the lateral (in a seat-width direction) inside of the side portion (side frame), respectively, the size of the structure in the periphery of the side portion (side frame) can be reduced.

Furthermore, because of the arrangement through the load input member, the impact reduction member, and the side portion (side frame), the load input member, and the impact reduction member operate independently without interfering each other, which enables an effective absorption of the impact load.

In this case, it is preferable for at least a part of the impact reduction member to be arranged at a position laterally overlapping the load input member.

Because the at least part of the impact reduction member is arranged in the position overlapping the load input member provided on the lateral side of the seat back frame in the lateral direction, the size of a peripheral structure of the impact reduction member is not increased. This enables an effective reduction of the load of a side collision, rear end collision, and the like, and a size reduction of the peripheral structure on the lateral side of the seat back frame, i.e., the peripheral structure of the side portion (side frame). Therefore, for designing the vehicle seat, because the size of the structure around the side portion (side frame) will not increase, the design freedom increases. Furthermore, because at least a part of the impact reduction member is configured to be covered by the load input member, the impact reduction member can be protected.

Moreover, it is preferable for the load input member to include a first plate member arranged forward and a second plate member disposed rearward the first plate member with a space therebetween, and for the at least part of the impact reduction member to be arranged between the first plate member and the second plate member.

The load input member includes at least the first plate member and the second plate member, and these plates are arranged in positions facing each other spaced in a longitudinal direction. By arranging the at least part of the impact reduction member between the plates and enclosing the at least part of the impact reduction member in the load input member, the size of the configuration of the periphery of the impact reduction member can be further reduced.

Furthermore, it may also be preferable for the load input member to include a first plate member arranged forward and a second plate member disposed rearward the first plate member with a space therebetween; in which the at least part of the impact reduction member may be arranged at a position overlapping the first plate member and on a front side of the first plate member, or at a position overlapping the second plate member and on a rear side of the second plate member.

With such a configuration, because an installation state of the impact reduction member can be viewed from the outside even after a member configuring the at least part of the impact reduction member and the load input member are installed, a high workability is achieved.

In this case, it is preferable for the load input member to include a bulged portion bulging forward or rearward, and for the at least part of the impact reduction member to be arranged inside the bulged portion in the longitudinal direction.

Thus, by forming the bulged portion in the member configuring the load input member and forming an irregularity on its surface, the load input member can have a high rigidity against the load. Therefore, the strength can be retained even when a plate thickness of the member configuring the load input member is reduced, which results in a light-weight vehicle seat.

Furthermore, because the at least part of the impact reduction member can be arranged inside the bulged portion, a sufficient space is spared and the space can be fully used, so that the size of the structure around the impact reduction member can be reduced.

It is more preferable for a gap to be formed between the first plate member or the second plate member and a portion where the at least part of the impact reduction member provided to the side portion is arranged.

In the portion of the impact reduction member where the at least part of the impact reduction member and the plate configuring the load input member overlap, as long as the gap is formed between the plate and the side portion (side frame), the at least part of the impact reduction member can be arranged inside the gap. Thus, the size of the structure around the impact reduction member can be reduced without a contact between the member configuring the impact reduction member and the member configuring the load input member.

Moreover, it is preferable for a hole portion to be formed in a part of the load input member.

With the hole portion being formed in the part of the load input member, because the inside of the load input member can be viewed through the hole portion even when the impact reduction member is arranged inside the load input member, the installation condition of the impact reduction member can be easily checked.

Furthermore, because a part of the load input member is cut off by providing the hole portion, the weight of the vehicle seat can be reduced.

Moreover, because it is also possible to insert a tool through the hole portion, an assembling task of another member to be equipped on the vehicle seat can easily be performed, thereby improving the design freedom and the workability.

In this case, it is preferable for the at least part of the impact reduction member to be arranged at a position not overlapping the load input member in a lateral direction.

Thus, the at least part of the impact reduction member is arranged in the position not overlapping the load input member provided on the lateral side of the seat back frame in the lateral direction. Therefore, the configuration around the impact reduction member will not be complicated. Furthermore, because of a structure without overlapping of members with one another, a worker can easily attach each member at the time of assembling. As a result, it is possible to effectively reduce the load against side collision and rear end collision, and a peripheral structure on the lateral side of the seat back frame, i.e., the peripheral structure of the side portion (side frame) can be simplified. Therefore, because the work around the side portion (side frame) will not be complicated upon manufacturing of the vehicle seat, the workability is improved. Moreover, because the attachment work around the impact reduction member is simplified, the worker does not need to be skilled, thereby achieving a uniform quality of the vehicle seat.

Furthermore, it is preferable for the side portion to include a flat side plate and a rear edge bending inward from an end portion located on a rear side of the side plate, for a part of the load input member to be arranged at a position facing the rear edge, and for the at least part of the impact reduction member to be arranged on a front side of the load input member.

Thus, at the side portion, by bending the rear end portion inward and arranging the load input member facing and substantially flush with the rear edge, the strength against the load (especially against the load of the collision from the lateral side) can be increased. Moreover, when a large amount of load upon side collision is applied, the load is smoothly transferred from the load input member to the rear edge of the side portion, thereby further increasing the strength against the load from the lateral side.

Moreover, it is preferable for the side portion to include a flat side plate and a rear edge bending inward from the end portion located on the rear side of the side plate, for a tubular member arranged to overlap along a vertical direction of the rear edge to be further included, and for the at least part of the impact reduction member to be arranged forward the tubular member with a space from the tubular member.

Such a configuration improves an attachment strength of the tubular member (main pipe) arranged along the side portion and a rigidity against the load. Furthermore, because the tubular member is disposed with a space from the impact reduction member, they neither interfere with each other nor prevent an operation of the impact reduction member. Therefore, the strength against the load can be increased and also the impact reduction member can be moved smoothly.

Further still, it is preferable for the side portion to include a convex portion bulging inward at a position where the at least part of the impact reduction member is arranged, and for the tubular member to be arranged between the convex portion and the rear edge.

Thus, by providing the convex portion bulging inward at the side portion (side frame) and arranging the at least part of the impact reduction member inside the convex portion, positioning of a member configuring the impact reduction member can easily be performed when arranging it. Furthermore, by arranging the tubular member in the space formed between the convex portion and the rear edge bending inward at the side portion, the space can be fully used, and whereby the size of the structure around the side portion (side frame) can be reduced.

According to an embodiment of the vehicle seat, by providing the load input member and the impact reduction member on the side portion, the seat can have a sufficient strength against the impact load of a side collision and rear end collision, and also can effectively absorb the impact load applied to the occupant.

According to an embodiment of the vehicle seat, by providing the load input member and the impact reduction member on the outer surface (laterally outer surface) and the inner surface (laterally inner surface) of the side portion respectively via the side portion, the size of the structure around the side portion can be reduced.

According to an embodiment of the vehicle seat, because a part of the impact reduction member causing the occupant to move rearward by the pressure receiving member moving rearward is arranged to overlap the load input member, the size of the structure around the side portion can be reduced, thereby improving the design freedom.

According to an embodiment of the vehicle seat, because the at least part of the impact reduction member is configured to be included, the size of the structure around the impact reduction member will not increase, and thereby the size is further reduced.

According to an embodiment of the vehicle seat, the installation condition of the impact reduction member can be visually checked even after the load input member and the impact reduction member have been installed in the seat back frame.

According to an embodiment of the vehicle seat, rigidity of the load input member against the load is increased by providing an irregular shape with a bulged portion on the surface of the load input member, and also the size of the structure around the impact reduction member can be reduced by arranging the at least part of the impact reduction member inside the bulged portion.

According to an embodiment of the vehicle seat, because the at least part of the impact reduction member is arranged inside the gap formed between the load input member and the side portion, the size of the structure around the impact reduction member can be reduced.

According to an embodiment of the vehicle seat, through the hole portion provided to the load input member, the inside of the load input member can be viewed and the installation condition of the impact reduction member can be checked. Furthermore, by cutting off the part of the hole portion, the weight of the load input member itself is reduced, resulting in a light-weight vehicle seat.

According to an embodiment of the vehicle seat, because the at least part of the impact reduction member is arranged at a position not overlapping the load input member with a space therebetween, the structure around the side portion can be simplified and the workability of an attachment work of each component is improved. Furthermore, each component can be easily checked after the attachment work.

According to an embodiment of the vehicle seat, by arranging the load input member and the rear edge of the side portion facing each other, the strength against the load is increased and a transfer of the load between the members can be effectively performed.

According to an embodiment of the vehicle seat, by aligning the tubular member configuring the seat back frame with the side portion, the strength of the seat back frame is increased, and thereby the rigidity against the load at the time of the collision is increased.

According to an embodiment of the vehicle seat, positioning for installing a member configuring the impact reduction member in the impact reduction member is facilitated by providing a convex portion to the side portion, and also the size of the structure around the side portion is reduced by arranging the tubular member between the convex portion and the rear edge.

DETAILED DESCRIPTION

Hereinafter, embodiments of the present invention will be described with reference to the drawings. Members, arrangements, and the like described below are not intended to limit the invention, but can be modified in many ways within the scope of the invention. A vehicle herein refers to one for traveling on which a seat can be mounted, such as a ground traveling vehicle having wheels including an automobile and a train, an aircraft and a marine vessel travelling elsewhere, and the like. A seating load generally includes a seating impact generated at the time of seating, a load of an acceleration generated by a sudden start of a vehicle, and the like. A load of rear end collision refers to a large load generated by rear end collision including a severe collision from a rear side by a vehicle, a severe collision during a backward driving, and the like, but does not include those in a load range similar to the load generated at the time of a normal seating. Furthermore, a load of a side collision refers to a large load generated by side collision including a severe collision from lateral side by a vehicle, but does not include those in the load range similar to the load generated at the time of the normal seating.

Moreover, the term "lateral direction" means a side-to-side direction relative to the front of the vehicle, and it is a direction identical to a width direction of a seat back frame 1 described later. The term "longitudinal direction" means a rear-front direction while an occupant is seated.

Figure 8:
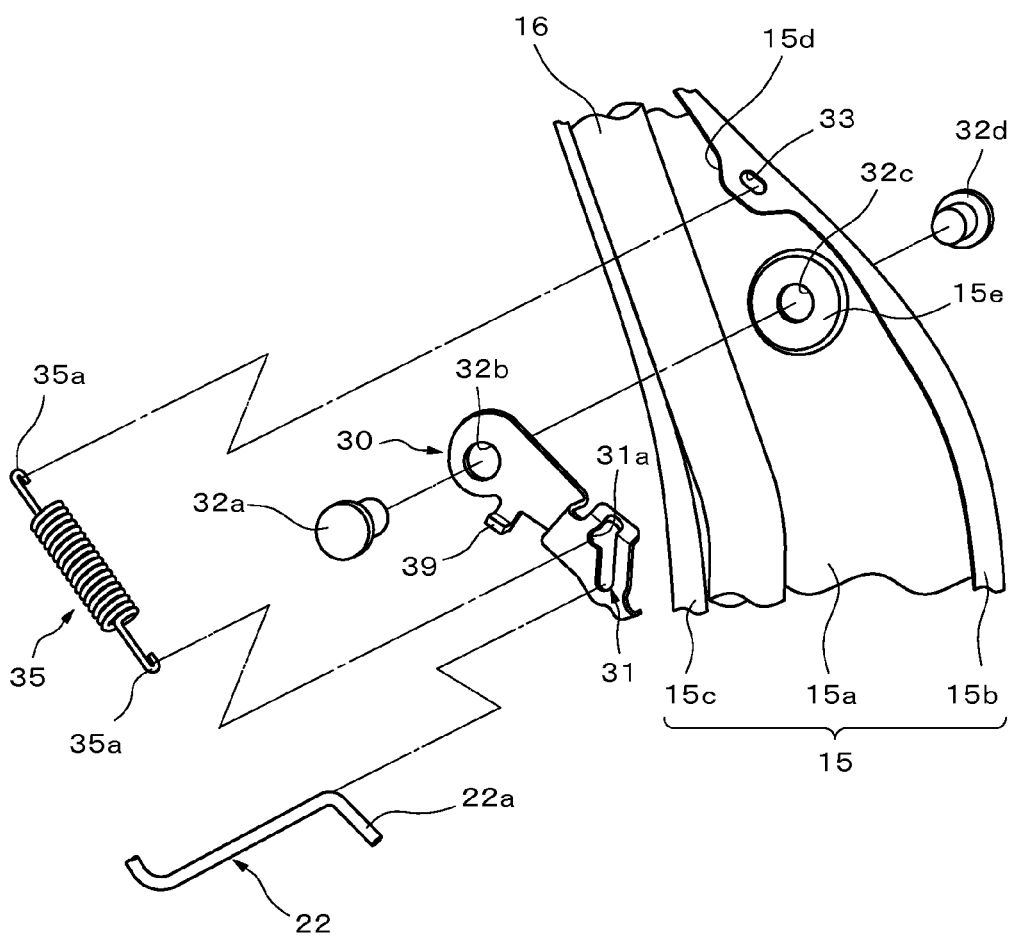
FIG. 8 is an exploded illustration of the impact reduction member and the biasing element according to the embodiment of the present invention.
Figure 9:
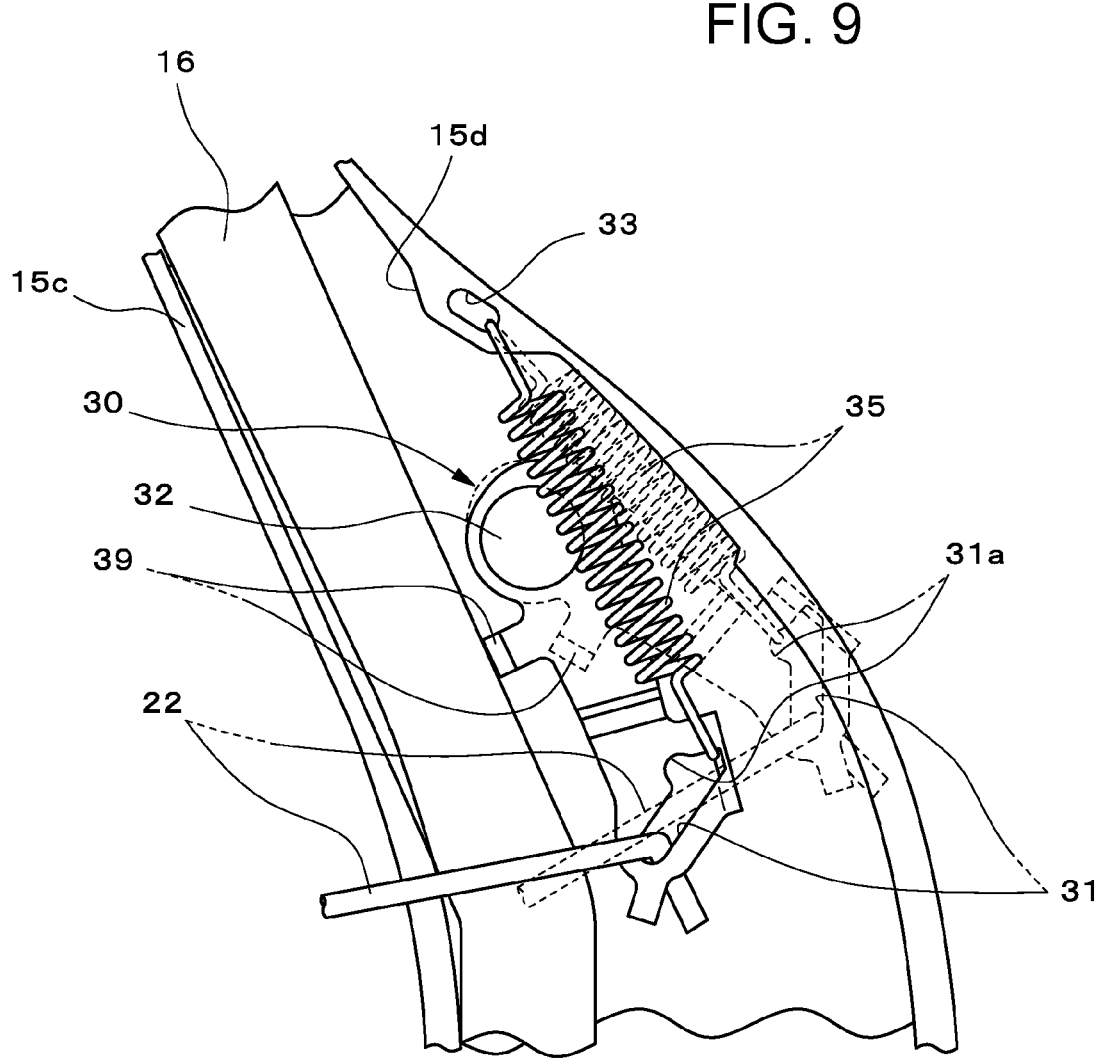
FIG. 9 is a side illustration showing states of the impact reduction member and the biasing element before and after rear end collision according to the embodiment of the present invention.
Figure 10:
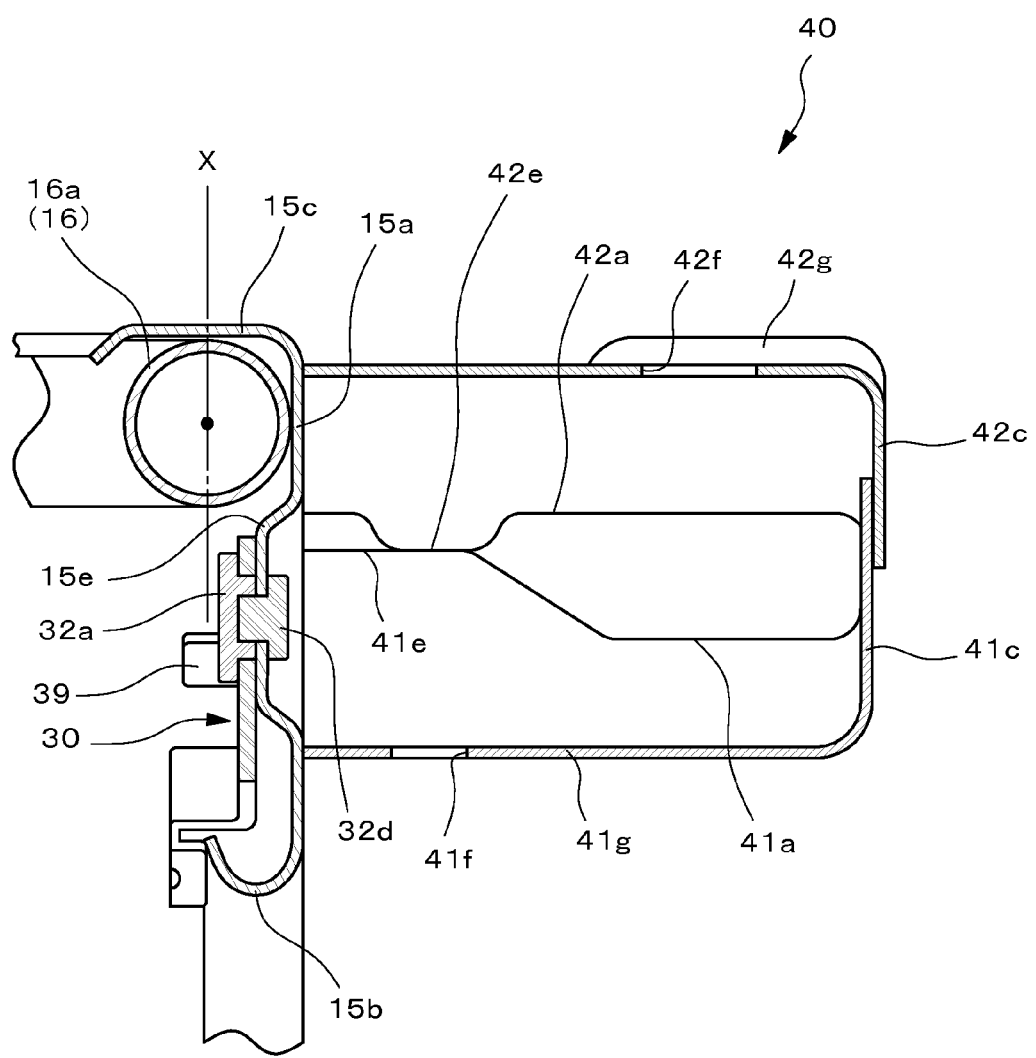
FIG. 10 is a schematic cross-sectional view of the load input member showing another embodiment of the present invention.
Figure 11:
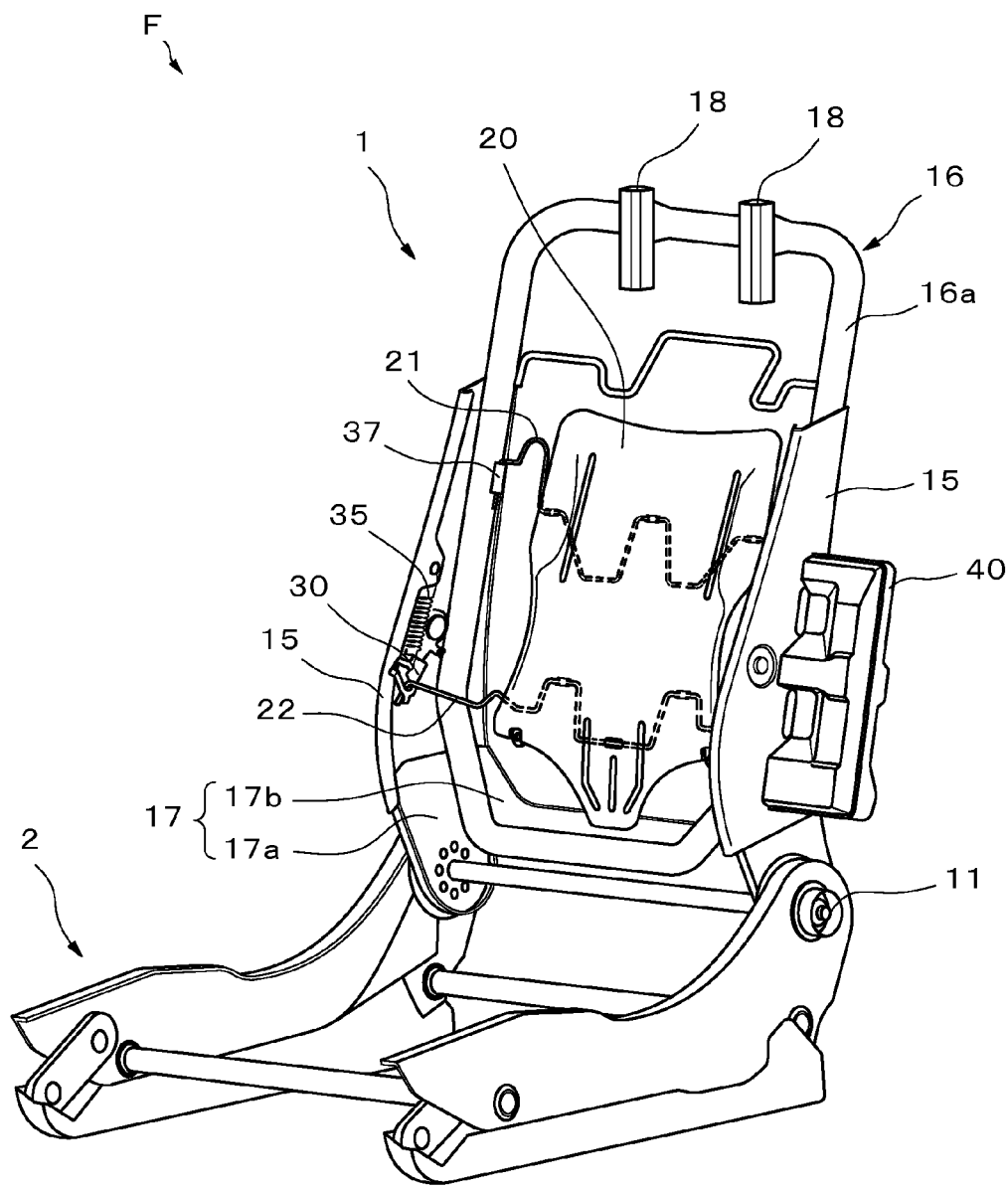
FIG. 11 is a schematic perspective view of the seat frame according to still another embodiment of the present invention.
Figure 12:
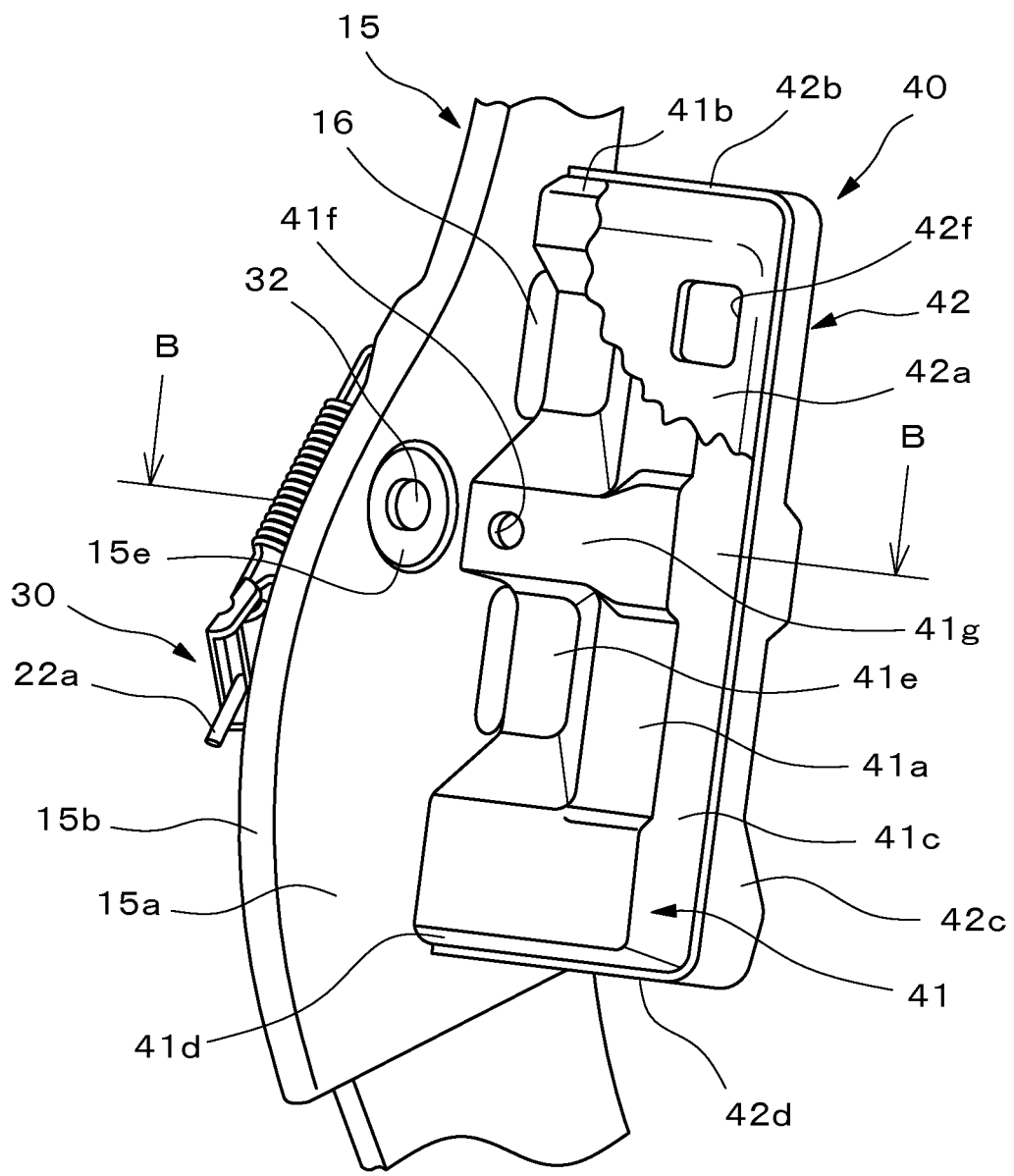
FIG. 12 is an enlarged perspective illustration showing a relation between the load input member and the side frame according to still another embodiment of the present invention.
Figure 13:
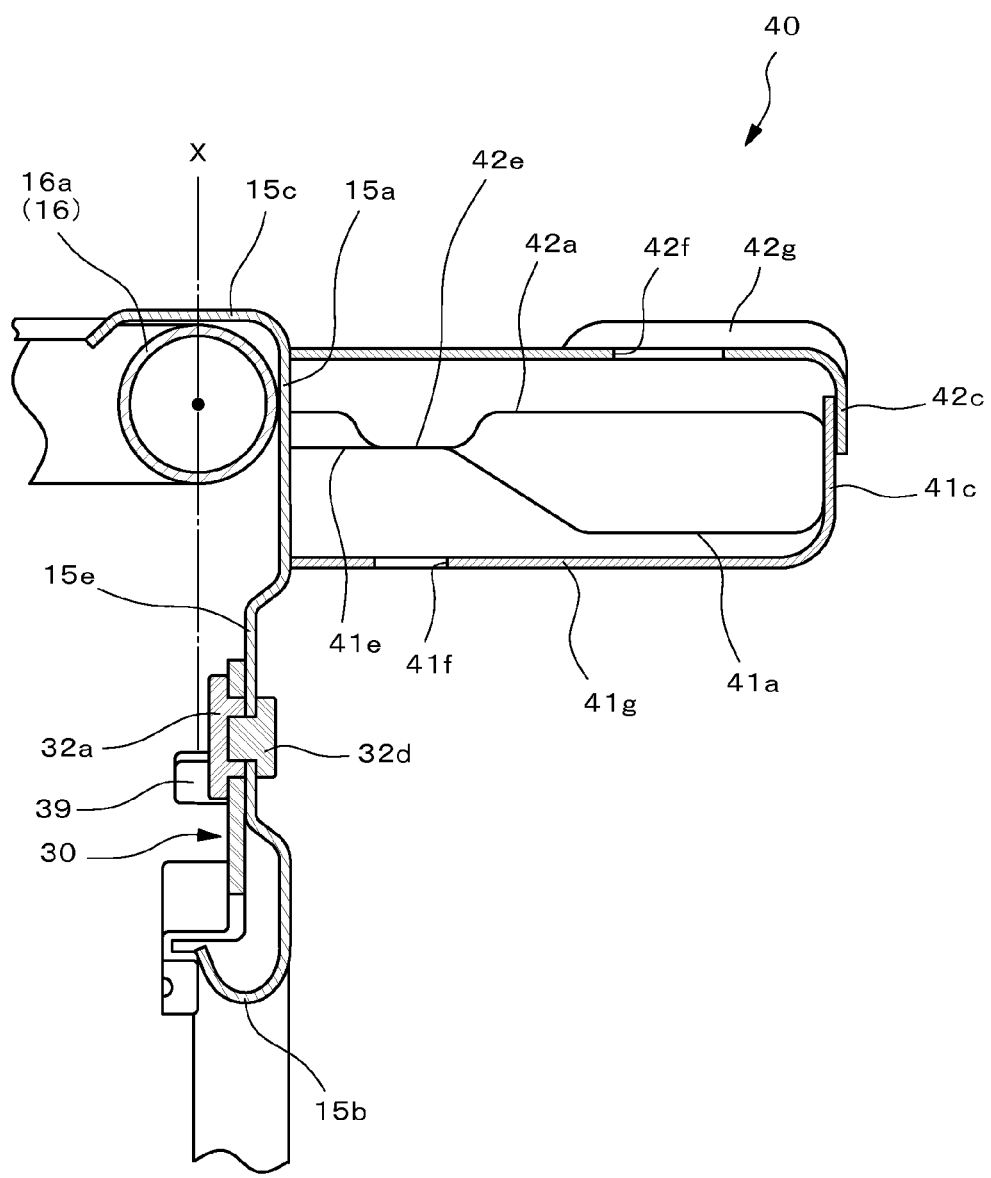
FIG. 13 is a schematic cross-sectional illustration along the B-B line in FIG. 12.

FIGS. 1 to 9 show a first embodiment of the present invention. FIG. 10 relates to another embodiment of the present invention. FIGS. 11 to 13 relates to still another embodiment of the present invention.

Configuration of Vehicle Seat S

Figure 1:
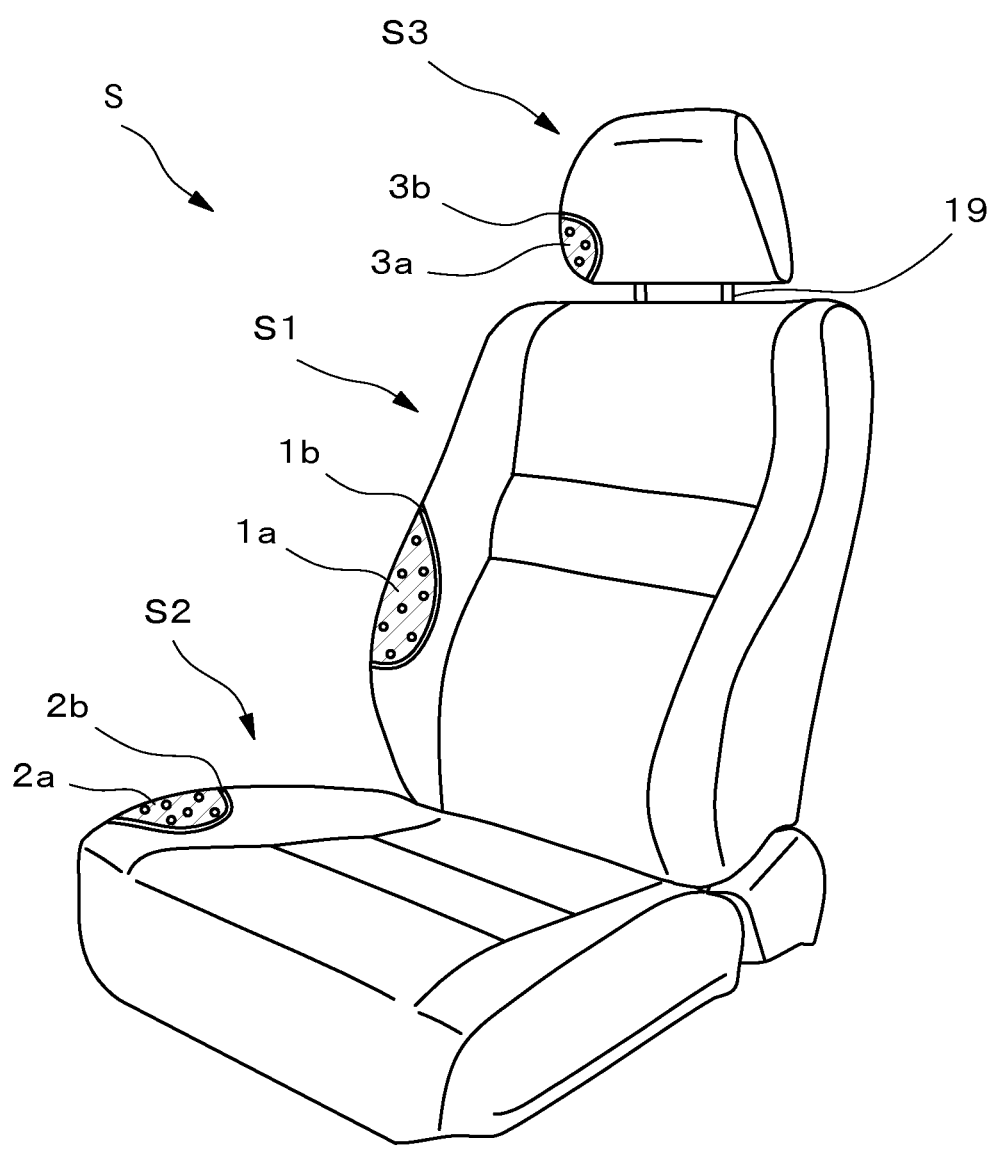
FIG. 1 is a schematic perspective view of a seat according to an embodiment of the present invention.

A vehicle seat S according to the embodiment is, as shown in FIG. 1, configured by a seat back S1 (back portion), a seat base S2, and a headrest S3; and the seat back S1 (back portion) and the seat base S2 include a cushion pad 1a, 2a placed on a seat frame F and covered by an outer layer material 1b, 2b, respectively. The headrest S3 is formed by arranging a pad material 3a on a core material (not shown) for the head and covering it with an outer layer material 3b. Denoted by the reference numeral 19 is a headrest pillar that supports the headrest S3.

Figure 2:
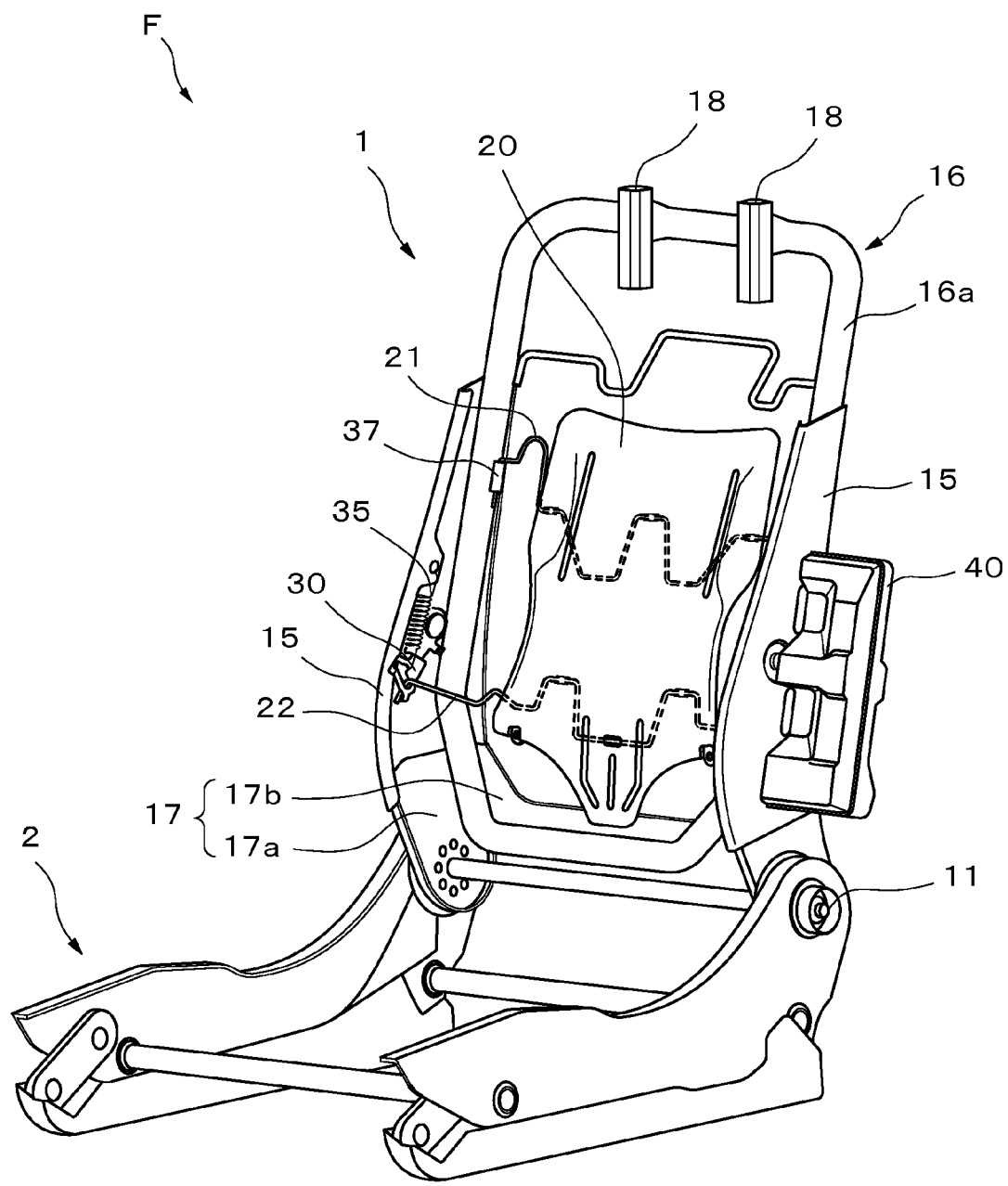
FIG. 2 is a schematic perspective view of a seat frame according to the embodiment of the present invention.

The seat frame F of the vehicle seat S is, as shown in FIG. 2, configured by a seat back frame 1 forming the seat back S1 and a seat base frame 2 forming the seat base S2.

The seat base frame 2 is, as described above, configured to have the cushion pad 2a placed thereon, cover the cushion pad 2a with the outer layer material 2b, and support the occupant from the lower side. The seat base frame 2 is supported by a leg portion, and the leg portion is attached with an inner rail that is not shown, to be assembled into a sliding type with its position longitudinally adjustable between an outer rail installed on a vehicle body floor.

Rear end portion of the seat base frame 2 is coupled to the seat back frame 1 via a reclining mechanism 11.

As described above, the seat back S1 includes the cushion pad 1a placed on the seat back frame 1 and the outer layer material 1b covering the cushion pad 1a, and supports the back of the occupant from behind. In this embodiment, the seat back frame 1 is a substantially rectangular frame body equipped with a side portion, an upper portion, and a lower portion, as shown in FIG. 2.

The side portion includes two side frames 15 spaced in the lateral direction to form a seat back width and extending in the vertical direction. A main pipe 16 serving as a tubular member coupling both upper end portions of the side frame 15 to each other extends upward from the side portions thereof to form an upper portion. The main pipe 16 not only forms the upper portion, but also forms a lower portion by extending upward from one side frame 15 to the other side frame 15 and then further downward. Although this embodiment shows a case in which the main pipe 16 is formed in a circular shape around the upper portion, the side portion, and the lower portion to form the frame body, any other shape can be used as long as it has an enough rigidity to withstand the load upon collision.

The lower portion of the seat back frame 1 is formed by coupling the lower end portions of the side frames 15 to the lower frame 17. The lower frame 17 includes an elongated portion 17a coupled to the lower side of the side frames 15 and extending downward and an intermediate portion 17b coupling both sides thereof to each other, and the elongated portion 17a is elongated as long as appropriate in relation to the seat base frame 2.

Although the seat back frame 1 according to the embodiment is formed by the side frames 15, the main pipe 16, and the lower frame 17 as separate members, it may otherwise be formed by an integral plate shaped frame or the like. It may also be configured to include a device such as a power motor attached to the lower portion.

As shown in FIG. 2, the main pipe 16 as the tubular member is bent into a substantially rectangular shape, a side surface portion 16a of the main pipe 16 is arranged to be partially overlapping a side plate 15a of the side frame 15 along the vertical direction (see FIG. 4), and it is anchor jointed to the side frame 15 at the overlapping portion.

The headrest S3 is arranged above the main pipe 16 configuring the upper portion. The headrest S3 is formed by, as described above, providing the pad material 3a on an outer periphery of the core material (not shown) and covering the outer periphery of the pad material 3a with the outer layer material 3b. The main pipe 16 is provided with a pillar support portion 18. The pillar support portion 18 is configured to be attached with the headrest pillar 19 (see FIG. 1) supporting the headrest S3 via a guide block (not shown) so that the head rest S3 can be attached thereto.

The side frames 15 serving as the side portions configuring a part of the seat back frame 1 are, as shown in FIG. 2, configured to have a predetermined length in the vertical direction and to face each other with a predetermined distance therebetween in the lateral direction.

Figure 7:
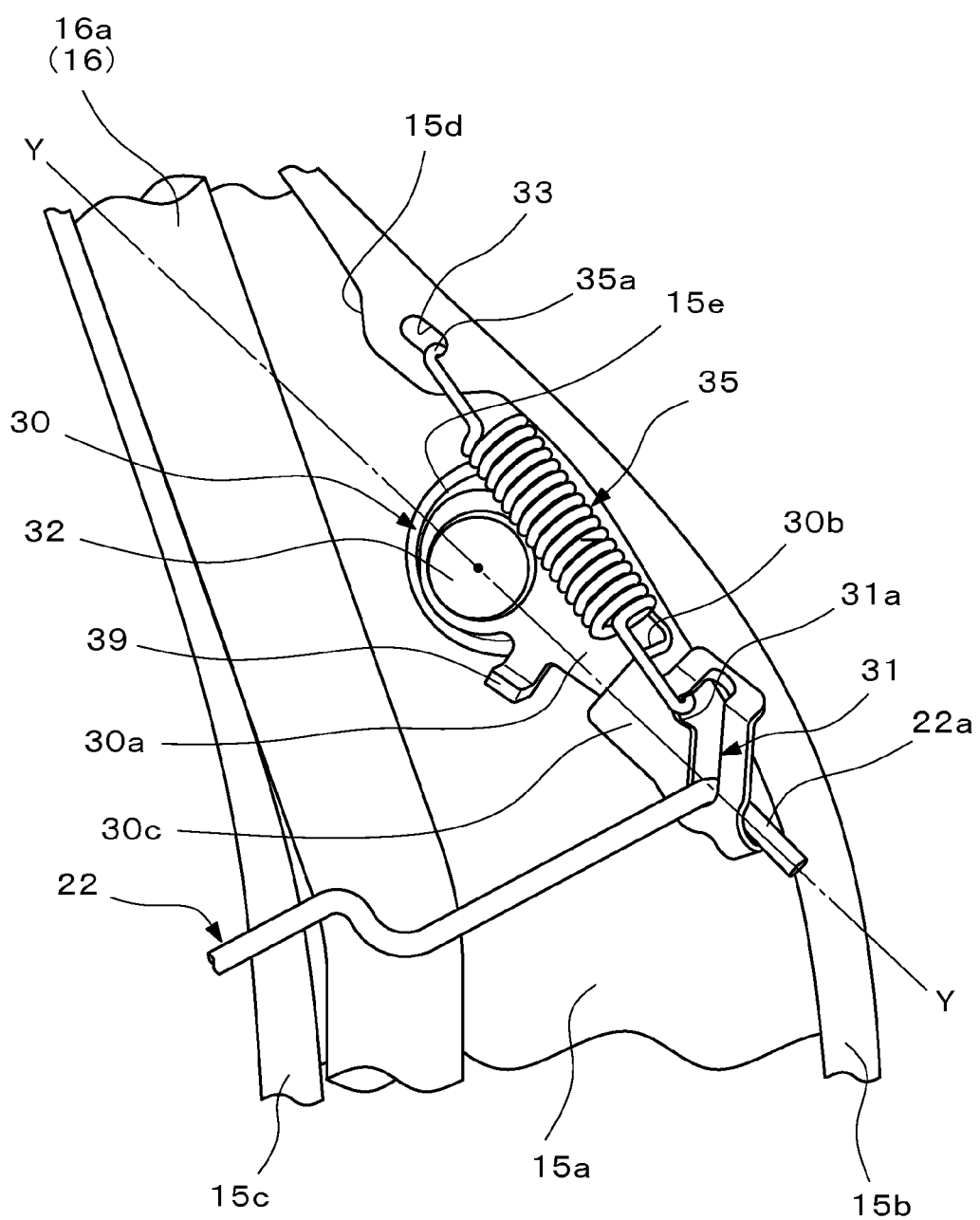
FIG. 7 is an enlarged side illustration showing a relation between the impact reduction member and a biasing element according to the embodiment of the present invention.

The side frame 15 is an extension member configuring a side surface of the seat back frame 1, and includes the flat side plate 15a, a front edge 15b folded inward from a front end portion of the side plate 15a (end portion located forward the vehicle) into a U-shape, and a rear edge 15c bent inward from the rear end portion into an L-shape (see FIG. 7).

On the front edge 15b according to the embodiment, as shown in FIG. 7, a protrusion portion 15d projecting on the side of the rear edge 15c is formed, and the protrusion portion 15d is formed with a locking hole 33 as a locking portion to lock a spring.

Figure 3:
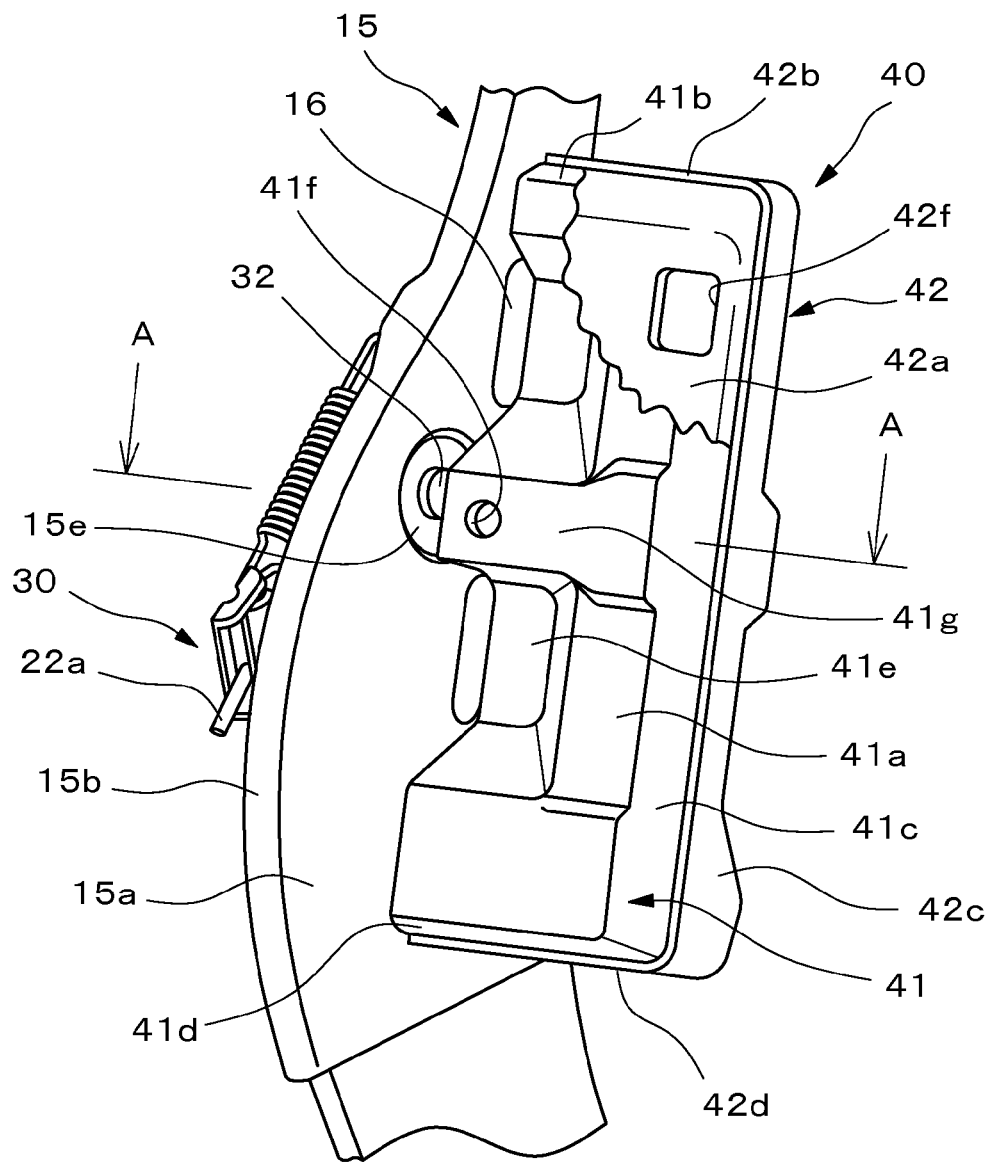
FIG. 3 is an enlarged perspective illustration showing a relation between a load input member and a side frame according to the embodiment of the present invention.
Figure 4:
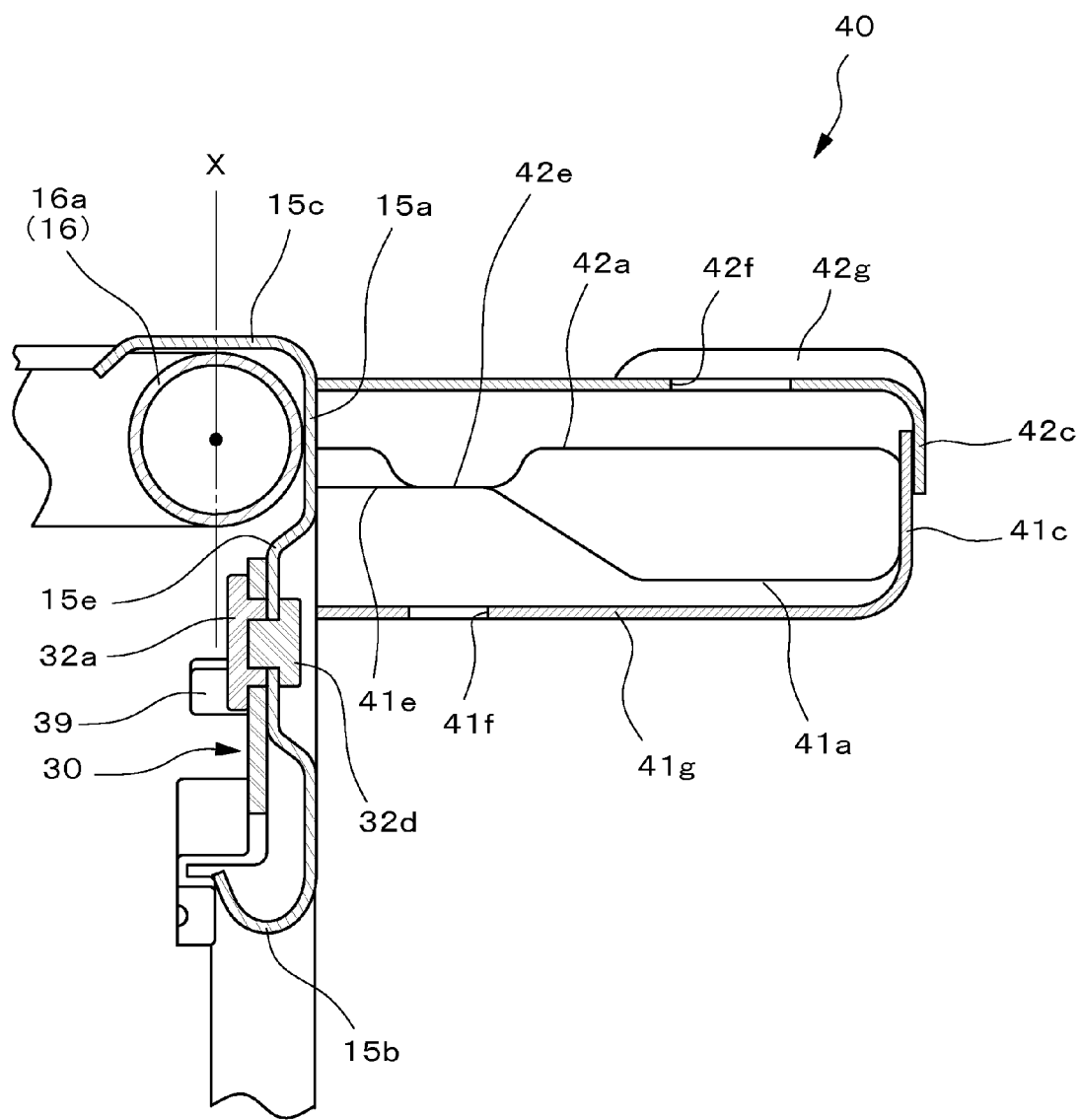
FIG. 4 is a schematic cross-sectional illustration along the A-A line in FIG. 3.

The inside of the rear edge 15c according to the embodiment is arranged in contact with a surface of the main pipe 16 in a form of a pipe (see FIG. 4). As shown in FIG. 3, a part of the side plate 15a is bent and provided with an opening so that a part of the surface of the main pipe 16 protrudes through the opening.

A movement member 30 to be described later is locked on a laterally inner surface of the side frame 15 according to the embodiment. A configuration and function of the movement member 30 will be described later.

A load input member 40 that receives a load of a collision is jointed to a position on the lateral side of the seat back frame 1 (more specifically, a laterally outer surface of the side frame 15) and also on a vehicle door side (on the right side in FIG. 2).

The load input member 40 is arranged to receive the load of a side collision and transfer the load to other members configuring the seat frame F, such as the side frame 15, main pipe 16, and the like, and preferably attached to the side frame 15 arranged on the door side of the vehicle.

By attaching the load input member 40 to the side frame 15 arranged on the door side of the vehicle, the load of a side collision can be effectively transferred to the seat frame F from the vehicle door.

Although the load input member 40 is the member that receives the load of a side collision of the vehicle in this embodiment, it is not limited to this embodiment, and the load input member 40 can be a member that receives the load from the occupant, such as an armrest attachment member arranged to attach an armrest, a member such as an airbag attachment member that receives the load from an airbag when the airbag unit is actuated, or a member such as a motor that makes an attachment member receive the load by the dead load.

As shown in FIG. 3, the load input member 40 is configured by a first plate member 41 and a second plate member 42 longitudinally facing each other with a space therebetween and jointing each other. The first plate member 41 arranged on the front side of the vehicle includes an upper edge 41b bending rearward from an upper end of a front plate 41a into an L-shape, a side edge 41c bending rearward from the other side end of the front plate 41a opposite from the side frame 15 into an L-shape, and a lower edge 41d bending rearward from a lower end of the front plate 41a into an L-shape.

The second plate member 42 arranged on the rear side of the vehicle includes an upper edge 42b bending forward from an upper end of a rear plate 42a into an L-shape to overlap each side edge of the first plate member 41, a side edge 42c bending forward from the other side end of the rear plate 42a opposite from the side frame 15 into an L-shape, and a lower edge 42d bending forward from a lower end of the rear plate 42a into an L-shape.

The upper edge 41b, the side edge 41c, and the lower edge 41d of the first plate member 41 respectively overlap the upper edge 42b, the side edge 42c, and the lower edge 42d of the second plate member 42.

The load input member 40 according to the embodiment has a closed housing structure by jointing the side frame 15 and the main pipe 16 partially protruding from the side frame 15, thereby achieving an improved durability against the load from the lateral side. Furthermore, because the load input member 40 is directly jointed to the main pipe 16, the load can be dispersed also by twisting the main pipe 16 when the load is applied from the lateral side.

The load input member 40 is arranged with respect to the side frame 15 so that the rear edge 15c of the side frame 15 and the rear plate 42a of the load input member 40 face each other and continue substantially in a flush manner with each other (see FIG. 4). Such a configuration improves an attachment rigidity of the load input member 40 and also facilitates load transfer from the lateral side.

The front plate 41a of the first plate member 41 is formed with a concave portion 41e and a bulged portion 41g, and the rear plate 42a of the second plate member 42 is formed with a concave portion 42e and a bulged portion 42g. This configuration forms an irregular structure on the surface of the load input member 40, and therefore the load input member can have an increased strength against the load of a side collision. The concave portion 41e and the concave portion 42e forming the irregular structure are formed on opposing positions, and the surfaces of the concave portion 41e and the concave portion 42e are jointed together (see FIG. 4). Different from a case where the concave portions 41e, 42e are not jointed, jointing the concave portions 41e, 42e can ensure an equivalent strength even if the plate thickness is reduced. Therefore, the weight of the vehicle seat S can be reduced.

Hole portions 41f, 42f are formed on the front plate 41a of the first plate member 41 and the rear plate 42a of the second plate member 42, respectively. Although the shape of the hole portions 41f, 42f are not limited, the weight of the load input member 40 can be reduced by cutting off the hole portions 41f, 42f. The hole portions 41f, 42f also facilitate an installation of the movement member 30 to be described later, because the inside of the load input member 40 (the side frame 15 side) can be viewed through the hole portions 41f, 42f. In order to ensure the strength against the load from the lateral side, it is preferable for the hole portions 41f, 42f to be formed while bypassing the end portions of the first plate member 41 and the second plate member 42 abutting the side frame 15 or the main pipe 16. A plurality of the hole portions 41f, 42f may be formed in each of the first plate member 41 and the second plate member 42.

Inside the seat back frame 1 (between the side frames 15), a pressure receiving member 20 is arranged in an inner area of the seat back frame 1 as a posture maintaining member that supports the cushion pad 1a from behind.

The pressure receiving member 20 according to this embodiment is a resin plate formed into a substantially rectangular shape with a smooth concavo-convex pattern formed on the surface on the side making contact with the cushion pad 1a. As shown in FIG. 2, claw portions are formed on the upper side and the lower side on the rear side of the pressure receiving member 20 to lock wires 21, 22.

The pressure receiving member 20 according to the embodiment is supported by a joint member. That is, the two wires 21, 22 serving as the joint members are bridged between the side frames 15 on both sides, engaged with the pressure receiving member 20 by the claw portions formed at predetermined positions on the upper side and the lower side on the rear side of the pressure receiving member 20, thereby supporting the pressure receiving member 20 by the backside of the cushion pad 1a. The wires 21, 22 are formed by a steel wire rod having a spring characteristic and have a winding portion as a bending portion.

Especially in the two wires 21, 22 locked to the pressure receiving member 20 according to the embodiment, the lower wire 22 is configured to greatly be deformed by a load larger than a predetermined amount (the load larger than a load for movement or pivot of the impact reduction member to be described later) and to move rearward with a larger movement amount, due to the winding portion.

Figure 5:
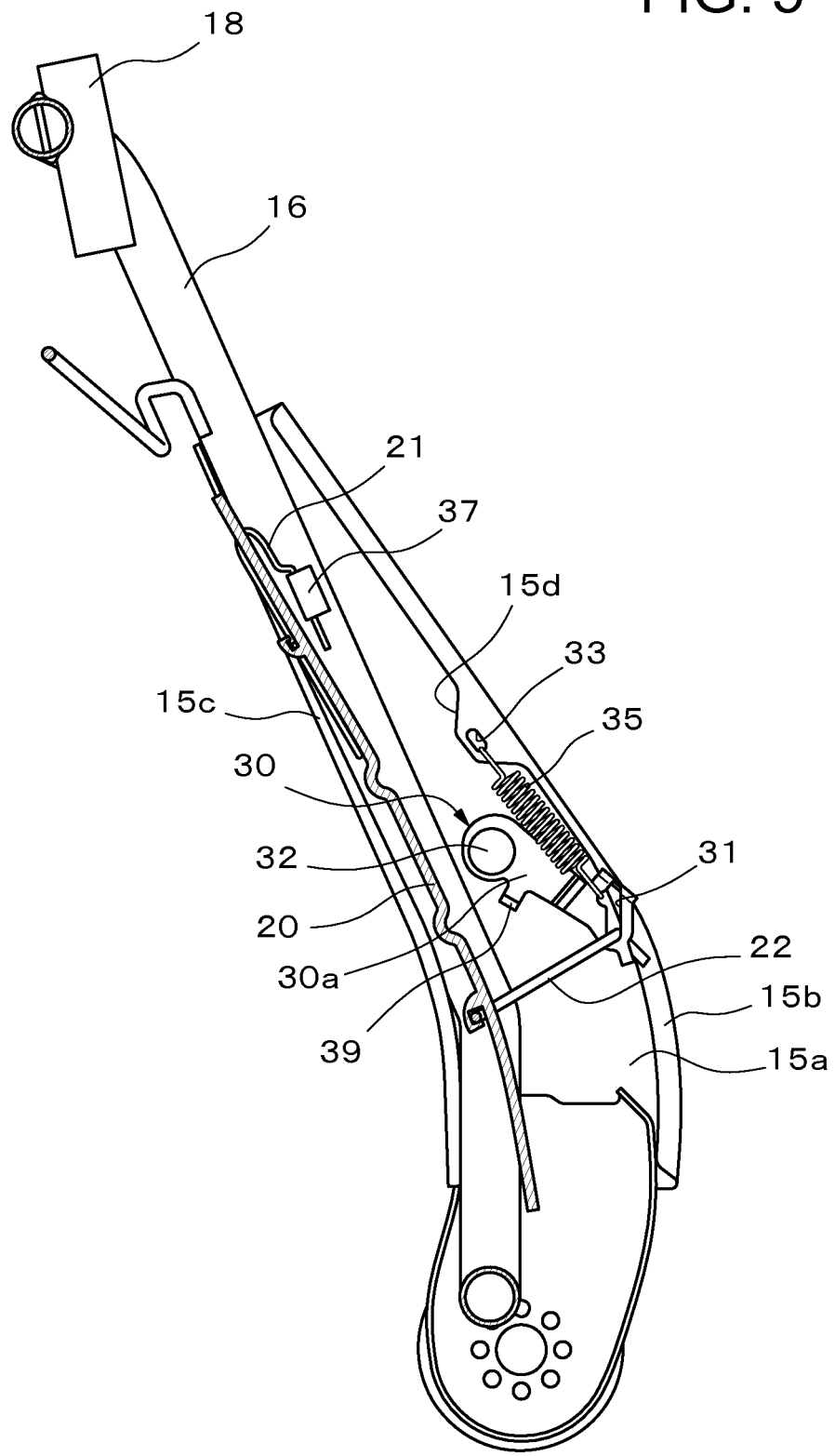
FIG. 5 is a schematic cross-sectional side illustration of a seat back frame before a pivot of an impact reduction member according to the embodiment of the present invention.
Figure 6:
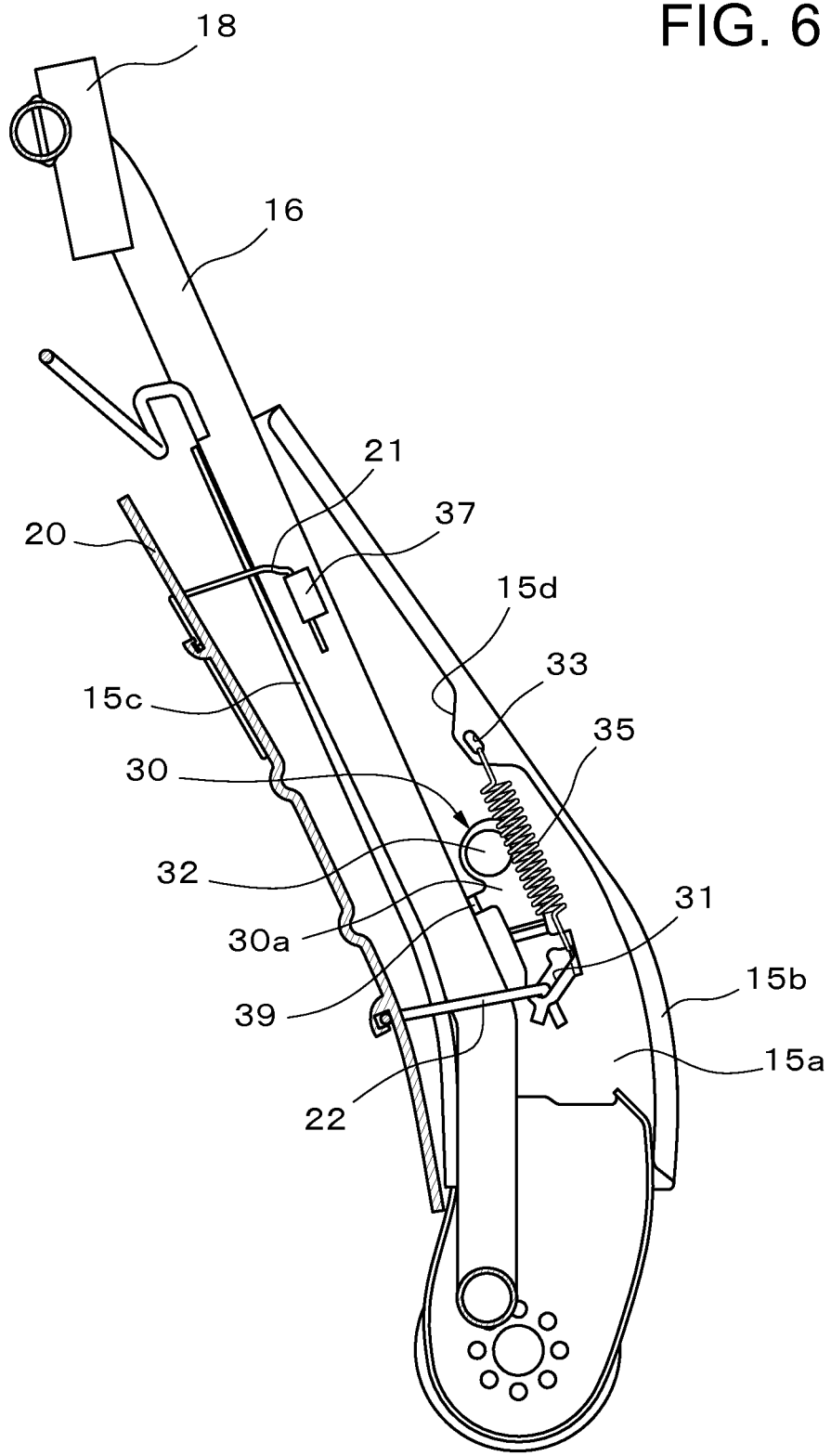
FIG. 6 is a schematic cross-sectional side illustration of the seat back frame after the pivot of the impact reduction member according to the embodiment of the present invention.

As shown in FIGS. 5 and 6, in the two wires 21, 22 locked on the pressure receiving member 20 according to the embodiment, both end portions of the wire 21 locked on the upper side are hooked on attachment hooks 37 provided to the side frames 15 on both sides. On the other hand, both ends of the wire 22 locked on the lower side are hooked on locking portions 31 of the movement members 30 mounted on the side frames 15 on both sides.

The movement member 30 serving as the impact reduction member is configured to move toward the rear side of the vehicle by an impact load transferred via the joint member (wire 22) and cause the occupant to move rearward when an impact load larger than a predetermined amount is applied to the pressure receiving member 20 due to rear end collision or the like. The term "movement" refers to a movement such as a horizontal displacement, pivoting, and the like. In this embodiment, the movement member 30 that pivots around a shaft 32 as a pivot axis is described. The movement of the movement member 30 toward the rear side of the vehicle can cause the pressure receiving member 20 to move rearward the vehicle by a large amount, thereby moving the occupant rearward, resulting in reduction of the impact applied to the occupant.

The movement member 30 according to the embodiment, as shown in FIGS. 7 and 8, is pivotally supported inside the side plate 15a of the side frame 15 on both sides via the shaft 32 (to be described later) acting as a pivot axis, locks the lower wire 22 serving as the joint member, and is connected to a spring (tension coil spring 35) serving as the biasing element that biases the wire 22. In other words, the movement member 30 is connected to the biasing element 35 and configured to bias the pressure receiving member 20 forward relative to the seat back frame 1 via the joint member 22.

The movement member 30 according to the embodiment is arranged inside the side frame 15 by the rotatable shaft 32.

As shown in FIG. 8, the shaft 32 is configured by a shaft member 32a, a shaft hole 32b provided to the movement member 30, a hole portion 32c provided to the side plate 15a of the side frame 15, and a fitting member 32d that fits the shaft member 32a into the hole portion 32c by an insertion through the shaft hole 32b, and fits the fitting member 32d from the tip end side of the shaft member 32a, thereby pivotally supporting the movement member 30. The side plate 15a of the side frame 15 is formed with a convex portion 15e bulging inward at the position where the shaft 32 is arranged.

The main pipe 16 is arranged between the convex portion 15e and the rear edge 15c of the side frame 15. With this configuration, because the main pipe 16 is arranged in a gap formed by the convex portion 15e and the rear edge 15c, the size of an installation site of the main pipe 16 will not be increased, and therefore the size of the configuration around the side frame 15 can be reduced, thereby achieving a space reduction.

The shaft 32 as the axis pivot is positioned and arranged at a position of the shaft hole 32b provided to the side frame 15. In this case, as shown in FIG. 4, at least a part of the movement member 30 is arranged at the position overlapping the load input member 40 in the lateral direction. In other words, the shaft 32 (more specifically, at least one of the shaft member 32a and the fitting member 32d) is arranged so that a part thereof overlaps the load input member 40 in the direction of the pivot axis. In this embodiment, the shaft 32 is arranged so that a part thereof overlaps the front plate 41a of the load input member 40. This configuration can achieve a space reduction because the shaft 32 and the load input member 40 are arranged overlapping each other in the lateral direction of the vehicle. Although this embodiment shows an example of a part of the shaft 32 overlapping the front plate 41a, it may otherwise overlap the rear plate 42a.

When the shaft 32 is arranged to overlap the front plate 41a of the load input member 40, it is preferable for a part thereof to be arranged forward the front plate 41a. Alternatively, when the shaft 32 is arranged to overlap the rear plate 42a of the load input member 40, it is preferable for a part thereof to be arranged rearward the rear plate 42a. With such an arrangement, the installation state of the shaft 32 can be visually checked even after the shaft 32 and the load input member 40 are installed in the seat back 1.

As shown in FIG. 4, with the configuration of the side frame 15 on which the convex portion 15e bulging inward from the side frame 15 is formed at an arrangement position of the shaft 32, the shaft 32 (more specifically, the fitting member 32d) is configured to be fit into the convex portion 15e. This enables the fitting member 32d to be arranged without abutment against the front plate 41a (or the rear plate 42a) of the load input member 40, and reduces the space therefor without placing the load input member 40 too close to the vehicle door.

Although this embodiment shows an example of the attachment of the shaft 32 by forming the convex portion 15e on the side frame 15, it is not limited to this embodiment and any other configuration may be employed as long as the gap is formed between the front plate 41a (or the rear plate 42a) of the load input member 40 and a portion of the side frame 15 where the shaft 32 is arranged. In other words, the gap is formed at a position between the side frame 15 and the front plate 41a (or the rear plate 42a) of the load input member 40 where the shaft 32 is arranged. Therefore, a part of the position where the shaft 32 is arranged on the front plate 41a (or the rear plate 42a) of the load input member 40 may be notched.

The movement member 30 according to this embodiment includes the rotatable shaft 32, the locking portion 31 of the joint member formed with a predetermined distance from the shaft 32, a locking portion (locking concave portion 31a) of the biasing element, and a movement preventing portion 39 preventing a movement (pivot).

The locking portion 31 for locking the joint member (wire 22) in this embodiment is formed by an elongated hole portion in order to facilitate an attachment of a hook shaped end portion (hook portion 22a) of the wire 22 serving as the joint member. The locking portion 31 is formed integrally with and in a continuous manner to a locking concave portion 31*a* for locking the biasing element (tension coil spring 35) to be described later.

A formation portion 30*c* of the locking portion 31 is formed by extending in an outer peripheral direction from a raised portion 30*b* formed to continuously rising on the outer peripheral side of a base portion 30*a* configuring the movement member 30.

The locking portion (locking concave portion 31*a*) of the biasing element according to the embodiment locks an end portion of the tension coil spring 35 serving as the biasing element, and is formed by notching, toward the rear side of the vehicle, a part of the formation portion 30*c* on which the locking portion 31 is formed. As shown in FIG. 7, the locking concave portion 31*a* is formed at a position forward the vehicle relative to a line Y connecting the center of the shaft 32 and the position where the wire 22 of the locking portion 31 is hooked.

The tension coil spring 35 as the biasing element according to the embodiment is, as shown in FIG. 7, formed by coiling a spring wire rod, and on each end portion thereof, a hook 35*a* is formed in a semicircular form. The hook 35*a* of the tension coil spring 35 is locked by the locking concave portion 31*a* of the movement member 30 and the locking hole 33 of the protrusion portion 15*d* of the side frame 15. With this configuration, the movement member 30 is biased toward the front of the seatback frame 1 by the tension coil spring 35.

The movement preventing portion 39 according to the embodiment is used to prevent a movement (pivot) when the movement member 30 moves (pivots) and, as shown in FIGS. 5, 6, and 7, it is formed so that a part thereof protrudes from the base portion 30*a* which is continuous from the outer peripheral side of the base portion 30*a* making a slide contact with the side plate 15*a* when the movement member 30 moves (pivots) around the shaft 32 and so that it rises substantially vertically. The movement preventing portion 39 regulates the movement (pivot) of the movement member 30.

That is, as shown in FIG. 7, the movement preventing portion 39 is formed to be bent and rise in the direction separated from the side plate 15*a* of the side frame 15.

The movement preventing portion 39 is an abutment portion that prevents the movement (pivot) by abutting against the main pipe 16 after the movement (pivot) of the movement member 30. A height of the end portion of the movement preventing portion 39 abutting against the main pipe 16 in the seat inside direction is defined to abut against the surface of the main pipe 16 at the time of the abutment.

The height of the end portion of the movement preventing portion 39 in the seat inside direction may be anywhere inside the centerline (line X) of the main pipe 16 (see FIG. 4). Thus, because the movement preventing portion 39 reliably abuts against the surface of the main pipe 16, the movement of the movement member 30 can be reliably controlled.

The movement preventing portion 39 is provided to regulate the movement (pivot) setting range of the movement member 30, and the movement preventing portion 39 is set to stop the movement thereof (pivot) by abutting against the main pipe 16 when the movement member 30 is moved (pivoted) by the load of rear end collision.

Thus, because the movement preventing portion 39 of the movement member 30 is formed integrally therewith by extending the movement member 30 in the outer peripheral direction, and its interface abuts against the main pipe 16 after the movement (pivot); the movement (pivot) of the movement member 30 can be stably and reliably stopped with a simple and strong configuration.

The movement preventing portion 39 is formed at a position not interfering with the biasing element (tension coil spring 35) to be described later and the joint member (wire 22).

Although this embodiment is configured so that the movement preventing portion 39 of the movement member 30 prevents the movement (pivot) by directly abutting against the main pipe 16, a sound deadening member such as a rubber element, with a thickness that does not inhibit the stability in stopping the movement (pivot) of the movement member 30 to deaden a noise generated at the time of the abutment, can be disposed between the movement preventing portion 39 and the main pipe 16, and this configuration enables a stable stop of the movement (pivot) and a sound deadening effect as well.

The movement member 30 described above is attached to the side frame 15 on each side, the locking portion 31 of the movement member 30 on each side is hooked by the hook portion 22*a*, i.e., each end portion of the wire 22, and thus the movement members 30 are configured to operate independently from each other.

In this embodiment, although the movement members 30 are attached to the side frames 15 on both sides, the movement members 30 attached to both sides are configured to move (pivot) independently from each other. Therefore, if a deviated load is generated, the movement members 30 move (pivot) independently at respective side portions depending on the load, thereby causing the body of the occupant to sink depending on the size of the impact load.

At the time of a normal seating when the occupant sits down, while there is generated a tensile force that moves (pivots) the movement member 30 rearward via the cushion pad 1*a*; the pressure receiving member 20, and the wire 22 in the seat back S1, the tension coil spring 35 biases the movement member 30 so that the movement member 30 is caused to move (pivoted) toward the front side of the seat back frame 1. In this case, the tension coil spring 35 coupled to the movement member 30 has a loading property such that it does not deflect by the load generated upon the normal seating, and therefore the movement member 30 is, at all times, held at its default position. That is, the movement member 30 is configured so that the force to return to the default state against the force to move (pivot) the movement member 30 becomes the greatest upon usual seating.

As for the movement member 30 at the time of rear end collision, FIG. 5 shows a state before the impact reduction member pivots, and FIG. 6 shows a state after the impact reduction member pivots. In FIG. 9, a dashed line shows a state before rear end collision and a solid line shows a state after rear end collision. At the time of rear end collision, as shown in FIG. 9, when the occupant receives the impact from behind and is about to move rearward due to the inertia force, the load applies the tension in the direction where the movement member 30 is caused to move (pivot) rearward (left side in FIG. 9) via the pressure receiving member 20 (not shown in FIG. 9) and the wire 22 locked by the pressure receiving member 20. The tension at this time creates the force enough to extend the tension coil spring 35 fixing the movement member 30 to the default position and to move (pivot) the movement member 30 rearward.

A threshold of the force at which the movement member 30 starts to move (pivot) is set to a larger value than the normal seating load.

Here, as for the threshold of the force at which the movement member 30 starts to move (pivot), because the load applied to the seat back S1 in the normal seating state (excluding herein a seating impact or a minor impact generated by a sudden start of the vehicle) is around 150 N, the threshold is preferably larger than 150 N. A threshold smaller than this value is not preferable, because it may allow a movement upon normal seating and may result in an impaired stability.

In further view of the seating impact generated at the time of the normal seating and the load of acceleration generated by sudden start of the vehicle or the like, it is preferable to set the value larger than 250 N, which enables a stable state without the movement member 30 being actuated at the time other than rear end collision.

As described above, by moving (pivoting) the movement member 30 rearward, the wire 22 hooked on the locking portion 31 is moved rearward, and the pressure receiving member 20 locked by the wire 22 and the cushion pad 1a supported by the pressure receiving member 20 are also moved rearward, thereby causing the occupant to sink into the seatback S1.

Movement (pivot) characteristics of the movement member 30 at the time of rear end collision will be described below in more detail with reference to FIG. 9.

At the default position before the movement (pivot) of the movement member 30, the locking portion 31 which locks the wire 22 and the locking concave portion 31a which locks the lower end portion of the tension coil spring 35 are arranged to be located forward the shaft 32 in the vehicle, and the upper end portion of the tension coil spring 35 is locked by the locking hole 33 formed in the protrusion portion 15d of the side frame 15 located above the movement member 30.

When rear end collision causes the tension greater than a predetermined value on the wire 22 and the movement member 30 starts moving (pivoting) against the tension coil spring 35, the tension coil spring 35 is extended and the locking concave portion 31a provided to the movement member 30 is moved rearward while pivoting around the pivot center of the shaft 32. The movement member 30 then, as shown in FIG. 9, moves (pivots) until the movement preventing portion 39 abuts against the main pipe 16 arranged by being jointed with the side frame 15 to prevent the movement (pivot) of the movement member 30. This moves the pressure receiving member 20 greatly toward the rear side of the seat back frame 1 from the state shown in FIG. 5 to the state shown in FIG. 6, thereby increasing the sinking amount.

This embodiment is configured so that a moving direction of the locking concave portion 31a does not match the direction in which the tension coil spring 35 extends when the movement member 30 moves (pivots) to move the pressure receiving member 20, because the upper end portion of the tension coil spring 35 is fixed to the locking hole 33 formed above the movement member 30.

In other words, the moving (pivoting) amount of the movement member 30 is not proportional to the tension load (deflection) of tension coil spring 35, i.e., the pivot angle of the movement member 30 is not simply proportional to the torque (pivotal force) in a forward pivot direction imparted by the tension coil spring 35.

That is, while the locking concave portion 31a locking the lower end portion of the tension coil spring 35 follows an arc-shaped path around the shaft 32, the locking hole 33 locking the upper end portion of the tension coil spring 35 is formed as a fixed end which is anchor-jointed above the movement member 30.

Because of such movement (pivot) characteristics with respect to the tension generated via the wire 22 as described above, the movement member 30 can reliably and effectively cause the occupant to sink into the cushion pad 1a of the seat back S1 upon rear end collision.

At this time, although the back of the occupant is moved rearward by sinking into the seat back S1, the position of the headrest S3 does not change relatively, and therefore a distance between the headrest S3 and the head is reduced. Therefore, it is possible to support the head by the headrest S3, resulting in an effect of effective reduction of the impact applied to the neck.

Although the above embodiment shows an example of providing the movement member 30 on the side frame 15 on each side, the movement member 30 may be provided only to one side frame 15 provided with the load input member 40. In this case, the other side frame 15 provided with no movement member 30 may be configured to directly lock the joint members (wires) 21, 22.

Furthermore, although the above embodiment shows an example in which the movement member 30 is arranged inside the seat back frame 1 (side frame 15), the movement member 30 may be provided outside. However, with a configuration in which the load input member 40 is provided outside the seat back frame 1 and the movement member 30 is provided inside thereof, an effective use of the space may be achieved to reduce the size of the peripheral configuration of the side frame 15. This is preferable because of a great amount of design freedom of the vehicle seat S.

Moreover, although the above embodiment shows an example in which the movement member 30 is provided inside the seat back frame 1 and the load input member 40 is provided laterally outside the seat back frame 1, the movement member 30 and the load input member 40 may be configured to be arranged in an overlapping manner with each other either laterally inside or outside the seat back frame 1.

Second Embodiment

Hereinafter, the seat frame F according to a second embodiment of the invention will be described with reference to FIG. 10. Because the configuration is the same as that of the above embodiment except for the relative positions of the shaft 32 and the load input ember 40, the same reference numerals are used in the drawings and the description thereof is omitted.

As for the installation position of the shaft 32, different from the above embodiment in which it is arranged to overlap a part of the load input member 40 (more specifically, the front plate 41a), it is installed in this embodiment to be fully enclosed inside the load input member 40. That is, the shaft 32 (more specifically, at least one of the shaft member 32a and the fitting member 32d) is arranged between the front plate 41a and the rear plate 42a of the load input member 40. Such a configuration can reduce the space for installing the shaft 32 and further improves the attachment strength of the movement member 30, because the fitting member 32d of the shaft 32 is protected by the load input member 40.

As described above, the concave portions 41e, 42e are formed on the front plate 41a and the rear plate 42a, respectively. The front plate 41a and the rear plate 42a are formed thereon with a bulged portion 41g and a bulged portion 42g to bulge in the forward or rearward direction between a plurality of concave portions 41e and the concave portions 42e arranged in the vertical direction, respectively. The bulged portion may be provided to either one of the front plate 41a and the rear plate 42a. Thus, by forming the bulged portions 41g, 42g and the concave portions 41e, 42e, the load input member 40 can easily receive a load from the lateral side because of its ridge portion, thereby increasing the rigidity.

The shaft 32 is arranged inside the bulged portion 41g and the bulged portion 42g, i.e., in the space formed by the bulged portion 41g and the bulged portion 42g. By enclosing the shaft 32 in the space formed in the bulged portions 41g, 42g in this manner, the space is not wasted and the size of the configuration around the shaft 32 will not be increased.

Furthermore, the hole portions 41f, 42f are formed in the load input member 40 as described above. Thus, even if the shaft 32 is configured to be enclosed inside the load input member 40, the installation site of the shaft 32 can be viewed through the hole portions 41f, 42f, thereby facilitating the installation of the movement member 30. Moreover, because a tool can be inserted through the hole portions 41f, 42f, it is also possible to install other members in the periphery of the load input member 40.

Third Embodiment

Hereinafter, the seat frame F according to a third embodiment of the present invention will be described with reference to FIGS. 11 to 13. Because the configuration is the same as that of the above embodiment except for the relative positions of the shaft 32 and the load input ember 40, the same reference numerals are used in the drawings and the description thereof is omitted.

As for the installation position of the shaft 32, different from the above embodiment in which it is arranged to overlap a part of the load input member 40 (more specifically, the front plate 41a), it is installed at a position not overlapping the load input member 40 in this embodiment.

The shaft 32 as a pivot axis is positioned and arranged at the position of the shaft hole 32b provided to the side frame 15. In this case, as shown in FIG. 13, at least part of the movement member 30 is arranged at the position not overlapping the load input member 40 in the lateral direction. In other words, the shaft 32 is arranged at the position not overlapping the load input member 40 in the direction of the axis of pivot. In this embodiment, the shaft 32 is arranged forward the front plate 41a of the load input member 40, and spaced so that the shaft 32 (more specifically, the shaft member 32a and the fitting member 32d) does not overlap the load input member 40. With this configuration, because the shaft 32 is installed outside the load input member 40 formed like a casing, an attachment work of the shaft 32 will not be interfered with by the load input member 40, thereby improving the workability. Furthermore, because a worker can view the shaft 32 without being blocked by the load input member 40, he/she can check the installation state of the shaft 32. Although this embodiment shows an example in which the shaft 32 is disposed forward the front plate 41a with a space therebetween, it may be disposed rearward the rear plate 42a with a space therebetween.

Moreover, the load input member 40 is disposed rearward the shaft 32 with a space therebetween and, as described above, the rear plate 42a of the second plate member 42 configuring the load input member 40 is arranged to face and to be flush with the rear edge 15c of the side frame 15. As a result, the rigidity of the load input member 40 against the load of a side collision is increased and further the load transfer upon side collision can be performed smoothly, thereby effectively transferring the load of a side collision to the member configuring a seat frame F'.

Furthermore, the shaft 32 is arranged forward the load input member 40 and arranged forward the main pipe 16 being jointed to the rear edge 15c of the side frame 15, with a space therebetween. With this configuration, because the main pipe 16 is reinforced by the side frame 15 and the main pipe 16 will not abut against the shaft 32, the movement member 30 described below can move smoothly around the shaft 32.

On the side frame 15 as shown in FIG. 13, the convex portion 15e bulging inward the side frame 15 is formed at the arrangement position of the shaft 32. With this configuration, the shaft 32 (more specifically, fitting member 32d) is configured to be fitted into the convex portion 15e. This facilitates the positioning of the fitting member 32d, thereby facilitating the installation work of the shaft 32 in the side frame 15.

Although the above embodiment shows an example of providing the movement member 30 inside the seat back frame 1 and providing the load input member 40 outside the seat back frame 1, the movement member 30 and the load input member 40 may be arranged at a position not overlapping each other either inside or outside the seat back frame 1.

Although the seat back S1 of a front seat of an automobile is described in the above embodiments as specific examples, the present invention is not limited thereto and a similar configuration is applicable to the seat back of a rear seat as well.

| TABLE OF REFERENCE NUMERALS | |
|---|---|
| S | vehicle seat |
| S1 | seat back |
| S2 | seat base |
| S3 | headrest |
| F | seat frame |
| 1 | seat back frame |
| 2 | seat base frame |
| 1a, 2a, 3a | cushion pad (pad material) |
| 1b, 2b, 3b | outer layer material |
| 11 | reclining mechanism |
| 15 | side frame |
| 15a | side plate |
| 15b | front edge |
| 15c | rear edge |
| 15d | protrusion portion |
| 15e | convex portion |
| 16 | main pipe (tubular member) |
| 16a | side surface portion |
| 17 | lower frame |
| 17a | elongated portion |
| 17b | intermediate portion |
| 18 | pillar support portion |
| 19 | headrest pillar |
| 20 | pressure receiving member |
| 21, 22 | wire (joint member) |
| 22a | hook portion |
| 30 | movement member (impact reduction member) |
| 30a | base portion |
| 30b | raised portion |
| 30c | formation portion |
| 31 | locking portion |
| 31a | locking concave portion |
| 32 | shaft |
| 32a | shaft member |
| 32b | shaft hole |
| 32c | hole portion |
| 32d | fitting member |
| 33 | locking hole |
| 35 | tension coil spring (biasing element) |
| 35a | hook |
| 37 | attachment hook |
| 39 | movement preventing portion |
| 40 | load input member |
| 41 | first plate member |
| 41a | front plate |
| 41b | upper edge |
| 41c | side edge |
| 41d | lower edge |
| 41e | concave portion |
| 41f | hole portion |
| 41g | bulged portion |
| 42 | second plate member |
| 42a | rear plate |
| 42b | upper edge |
| 42c | side edge |
| 42d | lower edge |
| 42e | concave portion |
| 42f | hole portion |
| 42g | bulged portion |

The invention claimed is:

1. A vehicle seat comprising:
   a seat back frame having a side portion located on a lateral side;
   a load input member arranged on the lateral side of the seat back frame so that a load from another member is input thereto;
   a pressure receiving member coupled to the seat back frame via a joint member and supporting an occupant; and
   an impact reduction member arranged on at least one side of the side portion, engaging with the joint member, and that moves the pressure receiving member rearward by an impact load applied to the pressure receiving member;
   wherein:
   the load input member comprises a first plate member arranged forward and a second plate member disposed rearward of the first plate member with a space therebetween;
   the load input member is joined to the side portion of the seat back frame and has a closed housing structure; and
   at least a part of the impact reduction member is arranged on a front side of the first plate member or on a rear side of the second plate member.

2. The vehicle seat according to claim 1, wherein:
   the load input member is arranged on a laterally outer surface of the side portion; and
   the impact reduction member is arranged on a laterally inner surface of the side portion.

3. The vehicle seat according to claim 1, wherein:
   the side portion includes a flat side plate and a rear edge bending inward from an end portion located on a rear side of the side plate;
   a part of the load input member is arranged at a position facing the rear edge; and
   the at least part of the impact reduction member is arranged on a front side of the load input member.

4. The vehicle seat according to claim 1, wherein:
   the side portion includes a flat side plate and a rear edge bending inward from an end portion located on a rear side of the side plate;
   a tubular member arranged to overlap along a vertical direction of the rear edge is further included; and
   the at least part of the impact reduction member is arranged forward the tubular member with a space from the tubular member.

5. The vehicle seat according to claim 4, wherein:
   the side portion includes a convex portion bulging inward at a position where the at least part of the impact reduction member is arranged; and
   wherein the tubular member is arranged between the convex portion and the rear edge.

6. A vehicle seat comprising:
   a seat back frame having a side portion located on a lateral side;
   a load input member arranged on the lateral side of the seat back frame so that a load from another member is input thereto;
   a pressure receiving member coupled to the seat back frame via a joint member and supporting an occupant; and
   an impact reduction member arranged on at least one side of the side portion, engaging with the joint member, and that moves the pressure receiving member rearward by an impact load applied to the pressure receiving member;
   wherein:
   the load input member comprises a first plate member arranged forward and a second plate member disposed rearward of the first s late member with a space therebetween;
   the load input member is joined to the side portion of the seat back frame and has a closed housing structure; and
   at least a part of the impact reduction member and a part of the load input member are arranged in a same vertical plane extending solely in a seat right-to-left direction.

7. A vehicle seat comprising:
   a seat back frame having a side portion located on a lateral side;
   a load input member arranged on the lateral side of the seat back frame so that a load from another member is input thereto;
   a pressure receiving member coupled to the seat back frame via a joint member and supporting an occupant; and
   an impact reduction member arranged on at least one side of the side portion, engaging with the joint member, and that moves the pressure receiving member rearward by an impact load applied to the pressure receiving member;
   wherein:
   at least a part of the impact reduction member and a part of the load input member are arranged in a same vertical plane extending solely in a right-to-left direction;
   the load input member includes a first plate member arranged forward and a second plate member disposed rearward of the first plate member with a space therebetween; and
   the at least part of the impact reduction member is arranged between the first plate member and the second plate member.

8. The vehicle seat according to claim 7, wherein:
   the load input member includes a bulged portion bulging forward or rearward; and
   the at least part of the impact reduction member is arranged inside the bulged portion in a longitudinal direction.

9. The vehicle seat according to claim 7, wherein a gap is formed between:
   the first plate member or the second plate member; and
   a portion where the at least part of the impact reduction member is provided to the side portion is arranged.

10. The vehicle seat according to claim 7, wherein a hole portion is formed in a part of the load input member.

11. A vehicle seat comprising:
    a seat back frame having a side portion located on a lateral side;
    a load input member arranged on the lateral side of the seat back frame so that a load from another member is input thereto;
    a pressure receiving member coupled to the seat back frame via a joint member and supporting an occupant; and
    an impact reduction member arranged on at least one side of the side portion, engaging with the joint member, and that moves the pressure receiving member rearward by an impact load applied to the pressure receiving member;
    wherein:
    at least a part of the impact reduction member and a part of the load input member are arranged in a same vertical plane extending solely in a right-to-left direction;

the load input member includes a first plate member arranged forward and a second plate member disposed rearward of the first plate member with a space therebetween; and the at least part of the impact reduction member is arranged:
- at a position overlapping the first plate member and on a front side of the first plate member; or
- at a position overlapping the second plate member and on a rear side of the second plate member.

12. The vehicle seat according to claim 11, wherein:
the load input member includes a bulged portion bulging forward or rearward; and
the at least part of the impact reduction member is arranged inside the bulged portion in a longitudinal direction.

13. The vehicle seat according to claim 11, wherein a gap is formed between:
the first plate member or the second plate member; and
a portion where the at least part of the impact reduction member is provided to the side portion is arranged.

14. The vehicle seat according to claim 11, wherein a hole portion is formed in a part of the load input member.

* * * * *